US008458885B2

(12) United States Patent
Bianco et al.

(10) Patent No.: US 8,458,885 B2
(45) Date of Patent: Jun. 11, 2013

(54) METHOD FOR ASSEMBLING A PIECE OF METAL MATERIAL TO A PIECE OF COMPOSITE MATERIAL

(75) Inventors: Stephane Bianco, Toulouse (FR); Laurent Pinto, Fonsorbes (FR)

(73) Assignee: Airbus Operations (S.A.S.), Toulouse (FR)

( * ) Notice: Subject to any disclaimer, the term of this patent is extended or adjusted under 35 U.S.C. 154(b) by 324 days.

(21) Appl. No.: 12/934,281

(22) PCT Filed: Mar. 18, 2009

(86) PCT No.: PCT/FR2009/050447
§ 371 (c)(1),
(2), (4) Date: Jan. 26, 2011

(87) PCT Pub. No.: WO2009/122092
PCT Pub. Date: Oct. 8, 2009

(65) Prior Publication Data
US 2011/0119891 A1   May 26, 2011

(30) Foreign Application Priority Data
Mar. 28, 2008 (FR) ...................................... 08 52016

(51) Int. Cl.
*B21D 39/00* (2006.01)
(52) U.S. Cl.
USPC ........................................................ 29/522.1
(58) Field of Classification Search
USPC .............. 29/522.01, 523, 525, 428, 432, 444, 29/445, 453, 505, 507, 515, 522.1; 403/408.1, 403/312, 334, 337, 388; 411/339, 81
See application file for complete search history.

(56) References Cited

U.S. PATENT DOCUMENTS

| 3,603,626 A | * | 9/1971 | Whiteside .................. 403/408.1 |
| 4,087,896 A | * | 5/1978 | Salter .............................. 29/256 |
| 4,102,036 A | * | 7/1978 | Salter .............................. 29/525 |
| 4,974,989 A | | 12/1990 | Salter |

FOREIGN PATENT DOCUMENTS

| FR | 2551147 A1 | 3/1985 |
| WO | 2006057592 A1 | 6/2006 |

OTHER PUBLICATIONS

International Search Report, dated Sep. 16, 2009, from corresponding PCT application.

* cited by examiner

*Primary Examiner* — John C Hong
(74) *Attorney, Agent, or Firm* — Young & Thompson

(57) ABSTRACT

Process for assembling a first part made of metal material and a second part made of composite material, by an attachment element, which includes: —pre-piercing the parts to form a recess with a diameter D1 in the first and the second parts; —installing an insert having a variable diameter in the direction of the thickness of the parts in the recess, the insert including a main hollow body and at least one flange designed to rest at least partially against the outside surface of a part, the insert being designed to accommodate the attachment element; generating residual compression constraints by radial expansion on the inner wall of the insert by an expansion tool having an outside diameter that works with the inside diameter of the insert in at least one zone of the two parts along the circumference of the insert; —boring the recess of the main body wider so that the insert has a final inside diameter that is significantly greater than the outside diameter of the attachment element to allow play between the inner wall of the insert and the outside surface of the attachment element; and —positioning the attachment element in the insert to keep the parts together.

9 Claims, 3 Drawing Sheets

PRIOR ART

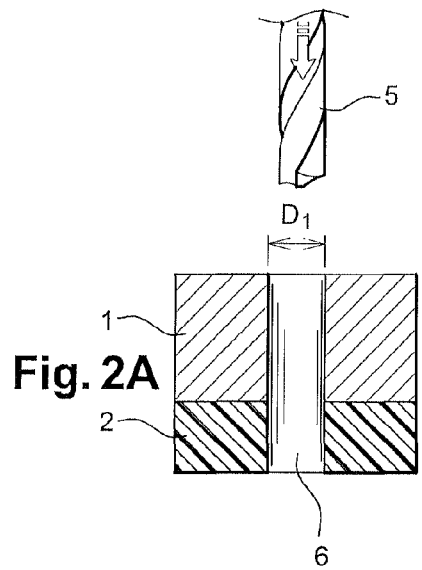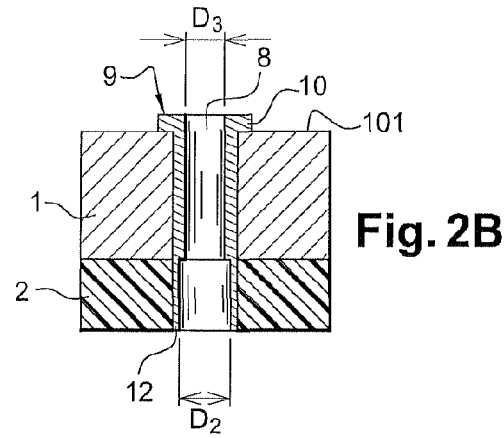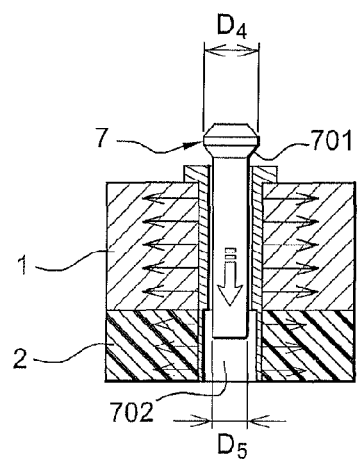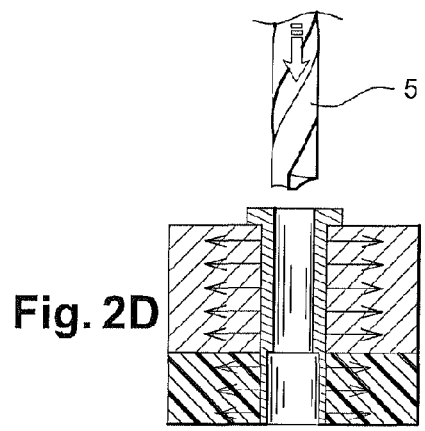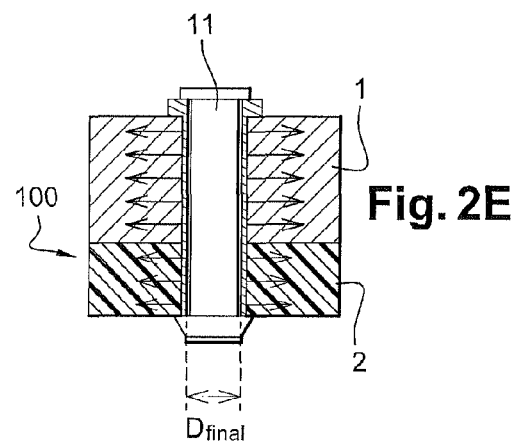

METHOD FOR ASSEMBLING A PIECE OF METAL MATERIAL TO A PIECE OF COMPOSITE MATERIAL

FIELD OF THE INVENTION

The invention relates to a process for assembly of a part made of metal material, such as a metal substrate, and a part made of composite material, such as a panel with a sandwich structure.

In a general manner, the invention is applied when it is necessary to assemble at least one part made of metal material with a part made of composite material, in particular for assemblies subjected to significant mechanical stresses. The invention is applied more particularly in the field of aeronautics, in which the assembly process can affect the fatigue life and the safety of aeronautical structures. The invention is also applied in the field of ground vehicles, for the assembly of parts designed to form light structures.

Hereinafter, the expressions "part made of metal material" and "part made of composite material" are respectively designated by the expressions "metal part" and "composite part."

BACKGROUND OF THE INVENTION

It is known to use a process for expansion of bores and for interference mounting of attachment for increasing the fatigue life in an assembly of two metal parts. These processes for expansion and interference induce residual constraints of compression at the surface of the bore and locally in the part around the recess. These constraints have the effect of delaying the triggering and the propagation of cracks of fatigue in the immediate vicinity of the bore. The result is an increase in the fatigue life.

FIG. 1.A illustrates a known process called interference mounting for the assembly of two metal parts 1a, 1b. It consists in making a hole 4 in the two metal parts, the hole having a diameter $D_{hole}$ that is less than the attachment diameter $D_{attachment}$ that is the diameter of the attachment rod. The insertion of the attachment 3 in the attachment hole directly generates compression constraints at the periphery of the hole.

FIG. 1.B diagrammatically illustrates another example of a known process called an expansion process for generating residual compression constraints locally around the attachment hole 4 in an assembly of a metal part 1a with a second metal part 1b. An expansion tool 7 is used. The process comprises the following stages:

An attachment hole is made by means of a conventional drilling tool in the two metal parts, the diameter of the hole is selected so that it is adapted to the diameter of the expansion tool 7, i.e., the diameter of the hole $D_{hole}$ is to be slightly less than the diameter of the expansion tool.

The expansion tool 7 that is called a burnisher is then passed through the hole that is made in the preceding stage; this tool comprises an olive-shaped expansion head 701 that has a diameter $D_{expansion}$ that is greater than the diameter of the attachment hole $D_{hole}$; its passage through the hole will exert a radial action on the inside wall of the hole, thus generating residual compression constraints in the two parts around the hole, and finally The attachment hole is bored wider to adapt the diameter of the hole to the diameter of the attachment rod, and then the attachment is placed to maintain the assembly of the two parts.

The two existing processes make it possible to generate constraints so as to increase the fatigue life at these working zones, critical due to the initiation of seams in loaded zones.

Within the framework of the assembly of a metal part and a composite part, it is no longer possible to apply processes as described above that would run the risk of greatly damaging the composite part.

The parts made of composite material exhibit exceptional properties in terms of resistance to mechanical fatigue and a strong rigidity while imparting a very low mass to the structures. These parts are implemented in particular in the aeronautics industry, including in greatly loaded structures. However, the assembly of these composite parts poses specific problems relative to the case of the metal parts.

Actually, the composite parts consist of structures that are obtained by stratification of resin-impregnated fibers, for example carbon fibers impregnated with an epoxy resin. Such a composite part has advantageous structural properties within the plane of fiber strata but is sensitive to delamination phenomena in a direction that is perpendicular to the planes, i.e., in the direction of the thickness of the parts, the direction used to place the attachment.

The compression forces exerted by the attachment means can produce the delamination phenomenon at the hole. In a general manner to prevent this delamination phenomenon, the constraints that appear at the attachment zone, i.e., at the interface between the inside wall of the attachment hole and the attachment element, should be reduced. For this purpose, and contrary to the case of an assembly of a metal part with another metal part, generally an attachment hole is made that has a diameter that is slightly larger than the diameter of the attachment so as to allow adequate play between the inner wall of the hole and the outside surface of the attachment to prevent interferences.

In aeronautical structures, the coexistence of the metal parts and composite parts leads to frequent assemblies of metal parts with composite parts. It may be a matter of junctions between two panels of different structures or local reinforcements, for example ribs, or metal stiffeners on a composite panel.

In such an assembly, either an assembly that comprises play between the wall of the holes and an attachment is selected, and the mounting is then unfavorable to the metal part in terms of fatigue life, or an assembly with interference is selected, and such a mounting runs the risk of damaging the composite part.

One solution would consist in independently making a hole for the attachment in the metal part and in the composite part, which are two separate parts, and then in generating residual compression constraints in the metal part in the absence of the composite part, and then, in a second step, placing the composite part against the metal part for the assembly. This solution is not satisfactory; actually in this case, it is necessary to predetermine precisely the positions of the holes so that they are aligned during the assembly for the passage of the attachment. This alignment cannot be produced industrially.

Another solution that is proposed in a prior, unpublished application consists in making an attachment hole in the metal part and in the composite part, and then in making a new bore in the hole beside the composite part so as to obtain a larger inside diameter than the diameter of the expansion tool. Thereby, the existence of two inside diameters in the attachment hole makes it possible to generate only residual compression constraints in the metal part.

However, this solution dictates having an access on the side of the composite part and even an access on each side.

SUMMARY OF THE INVENTION

The object of this invention therefore seeks to solve a problem of assembly of a metal part and a composite part by means of an attachment without having a detrimental effect on the fatigue life of the metal part and without damaging the composite part.

Another object of this invention is to be able to propose a solution that can be implemented even in the case where there is only one access on the metal part side.

For this purpose, the invention therefore has as its object a process for assembly of a part made of metal material and a part made of composite material, the assembly of said parts being implemented by means of an attachment element.

According to the invention, the process comprises the following stages in which:

- A pre-piercing is done in the two parts in such a way as to form a recess with a diameter D1 in the part made of metal material and in the part made of composite material,
- An insert that has a variable diameter is installed in the direction of the thickness of the parts in said recess, whereby said insert comprises a main hollow body and at least one flange that is designed to rest at least partially against the outside surface of a part, whereby said insert is designed to accommodate the attachment element,
- Residual compression constraints are generated by radial expansion on the inner wall of the insert by means of an expansion tool that has an outside diameter that works with the inside diameter of the insert in at least one zone of the two parts along the circumference of the insert,
- The recess of the main body of the insert is bored wider in such a way that the insert has a final inside diameter $D_{final}$ that is significantly greater than the outside diameter of the element of the attachment so as to allow play between the inside wall of the insert and the outside surface of the attachment element, and
- The attachment element is positioned in the insert to keep the metal part and the composite part together.

The invention also relates to a use of the process as described above for implementing the attachment of a part made of composite material, such as a panel with a sandwich structure on a part made of metal material, such as a panel support, to produce an aircraft structure.

BRIEF DESCRIPTION OF THE DRAWINGS

The invention will be better understood from reading the following description and the examination of the figures that accompany it. The latter are presented by way of indication and in no way limit the invention. The figures show:

FIG. 1.B: A cutaway view of an assembly of two metal parts that implement another process of the prior art;

FIG. 2.A, FIG. 2.B, FIG. 2.C, FIG. 2.D, and FIG. 2.E: the different stages of the assembly process between a metal part and a composite part according to a first embodiment of the invention;

DETAILED DESCRIPTION

Figure 1A:
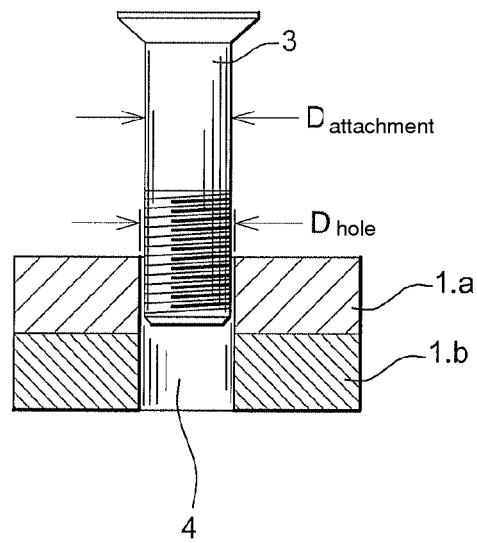
FIG. 1.A: A cutaway view of an assembly of two metal parts that implement an interference mounting process of the prior art.
Figure 1B:
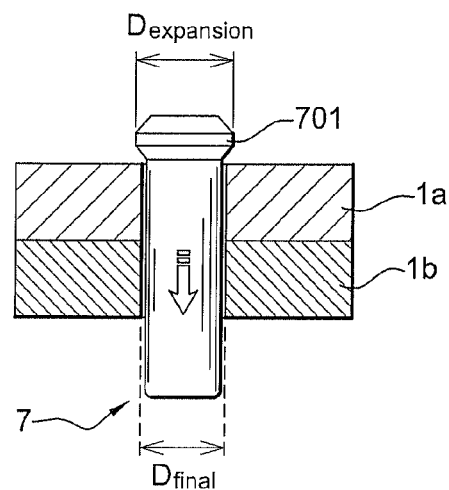

The process of this invention can be applied in a general manner to an assembly of a metal part 1 and a composite part 2 that are separate parts designed to be held against one another by means of an attachment element that is positioned in a bore that is made in said parts.

The main concept of the invention is to be able to generate—prior to the assembly of the metal part and the composite part—constraints in the metal part around the bore by means of an expansion process without damaging the composite part. The presence of these constraints makes it possible to increase the fatigue life in the metal part and to delay the propagation of cracks.

To do this, it is imperative that the stage of the expansion process be implemented without interference with the composite part so as to avoid creating constraints in the volume of the composite part that would damage the composite part.

In addition, this expansion process is to be able to be implemented even when there is only one access on the side of the metal part.

The different stages of an expansion process are illustrated in FIGS. 2.A, 2.B, 2.C, 2.D, and 2.E according to a first embodiment of the invention for the assembly of a metal part 1 and a composite part 2 by means of an attachment element 11. The attachment element 11 is a steel or titanium bolt.

The metal part 1 can be made, by way of example, in an aluminum alloy, and the composite part 2 can be made in a composite material that comprises fibers that are held by a resin, for example carbon fibers.

By way of example, the part 1 made of metal material is a metal substrate, and the part 2 made of composite material is a panel with a sandwich structure.

A pre-piercing is done in the two parts 1, 2 so as to form a recess 6 with a diameter D1 in the part 1 made of metal material and in the part 2 made of composite material (FIG. 2.A). This pre-piercing is done by means of a conventional drilling tool 5.

An insert 9 that has a variable diameter is then installed in the direction of the thickness of the parts in this recess 6 (FIG. 2.B). The insert comprises a main hollow body 12 for the passage of the attachment element 11 and a flange 10 that rests against the outside surface 101 of one of the two parts. In the example that is illustrated in FIG. 2.B, the flange rests against the outside surface of the metal part 1. An adhesive layer can advantageously be placed between the flange and the outer surface of the metal part so as to ensure the attachment of the insert in the recess.

In a variant form of the invention in which there is access to each side of the assembly, the insert can comprise, on both sides of the hollow body, a flange that rests against the outer surface of the parts.

The function of this insert consists in implementing an interfacing of the expansion tool and the two parts.

In this first embodiment of the invention, the insert 9 comprises a lower part that has an inside diameter D2 that corresponds to the part 2 made of composite material and an upper part that has an inside diameter D3 that corresponds to the part 1 made of metal material when the insert is positioned in said recess 6. The inside diameter D2 of the lower part of the insert is between the diameter of the recess D1 and the inside diameter D3 of the upper part of the insert.

According to this first embodiment of the invention, an expansion tool 7 that has an expansion diameter D4 that is greater than the inside diameters D2 and D3 of the insert (FIG. 2.C) is introduced. As a result, when it is introduced into the hollow body 12 of the insert, the tool exerts a radial action on the entire inner wall of the insert, thus generating residual compression constraints both in the metal part and in the composite part around the insert. With the diameter D2 being very slightly less than the diameter D4, the expansion rate is higher in the metal part than in the composite part.

Thus, by the presence of this insert whose diameter varies in the direction of the thicknesses of the parts, it is possible to monitor the expansion process, and in particular to promote the expansion rate in the metal part to improve the fatigue life while preserving the composite part of the possible delaminations.

The production of the residual compression constraints in the two parts prior to the assembly of the two parts makes it possible to produce piercings in the metal part with diameters that are greater than the diameters of the attachment elements, in such a way as to be compatible with the production tolerances and, optionally, to make it possible to interchange parts.

In a final stage (FIG. 2.D and FIG. 2.E), the recess of the main body 12 of the insert is bored wider in such a way that the insert has a final inside diameter $D_{final}$ that is essentially greater than the outside diameter of the attachment element 11 so as to leave play between the inner wall of the insert and the outside surface of the attachment element, and the attachment element 11 is positioned in the insert to keep the metal part and the composite part together for implementation.

The insert 9 is a single piece that is made of metal material and whose elastic modulus and plastic flow constraint are greater than the elastic modulus and the plastic flow constraint of the metal part of the assembly. Preferably, it is made of steel, titanium or Invar.

The expansion tool 7 comprises a tubular body 702 whose outside diameter D5 is less than the inside diameters D2 and D3 of the insert and an expansion head 701 whose outer diameter D4 is in this embodiment greater than both the inside diameter D3 and the diameter D4 of the insert.

Figure 3A:
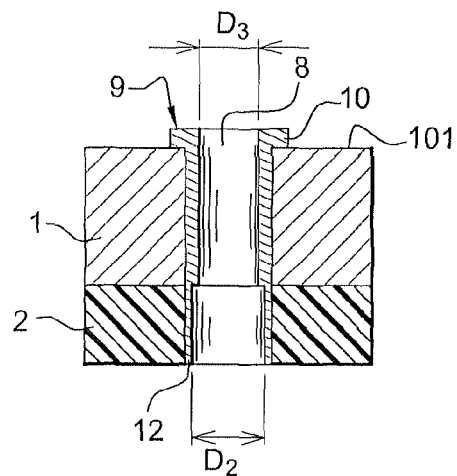
FIG. 3.A, FIG. 3.B, FIG. 3.C, and FIG. 3.D: the different stages of the assembly process between a metal part and a composite part according to a second embodiment of the invention.
Figure 3B:
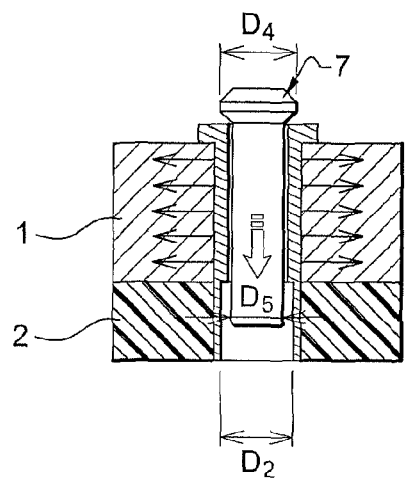
Figure 3C:
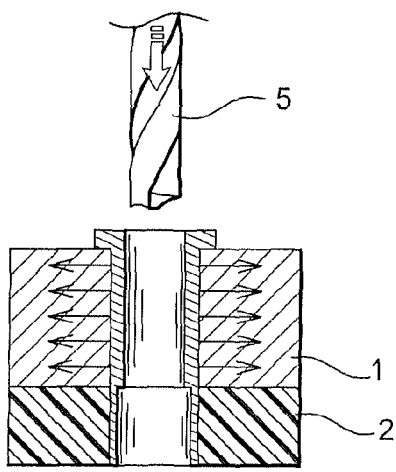
Figure 3D:
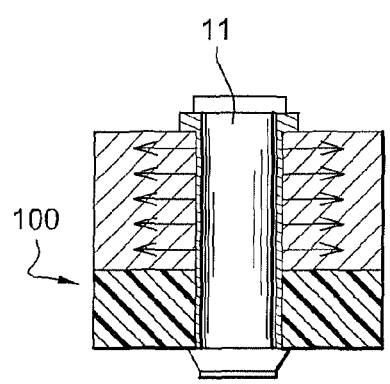

FIGS. 3.A, 3.B, 3.C, and 3.D illustrate a second embodiment of the invention in which, so as to avoid any risk of delamination in the composite part, the process of the invention makes it possible to not expand the composite part, but only the metal part, i.e., to generate only residual compression constraints in the metal part around the insert.

For this purpose, an expansion tool 7 that has an expansion diameter D4 that is, on the one hand, greater than the inside diameter D3 and, on the other hand, less than the inside diameter D2 is used. Thus, when the tool passes through the hollow body of the insert 11, it exerts only a radial action on the upper part of the inner wall of the insert that corresponds to the part 1 made of metal material, thus generating residual compression constraints that are only in the part made of metal material.

The process that is described above can be used to produce any type of aircraft structures 100 or ground vehicles starting from the assembly of a metal part such as a metal substrate and a composite part such as a panel with a sandwich structure.

The invention claimed is:

1. Process for assembly of a part (1) made of metal material and a part (2) made of composite material, the assembly of said parts being implemented by means of an attachment element (11), characterized in that the process comprises the following stages in which:
   a pre-piercing is done in the two parts in such a way as to form a recess (6) with a diameter D1 in the part (1) made of metal material and in the part (2) made of composite material,
   an insert (9) that has a variable diameter is installed in the direction of the thickness of the parts in said recess (6), whereby said insert comprises a main hollow body (12) and at least one flange (10) that is designed to rest at least partially against the outside surface (101) of a part, whereby said insert (9) is designed to accommodate the attachment element (11),
   residual compression constraints are generated by radial expansion on the inner wall of the insert by means of an expansion tool (7) that has an outside diameter that works with the inside diameter of the insert in at least one zone of the two parts along the circumference of the insert (9),
   the recess of the main body (12) of the insert is bored wider in such a way that the insert has a final inside diameter $D_{final}$ that is significantly greater than the outside diameter of the attachment element (11) so as to allow play between the inner wall of the insert and the outside surface of the attachment element, and
   the attachment element (11) is positioned in the insert to keep the metal part and the composite part together.

2. Process according to claim 1, wherein said insert (9) comprises a lower part that has an inside diameter D2 that corresponds to the part (2) made of composite material and an upper part that has an inside diameter D3 corresponding to the part (1) made of metal material when the insert is positioned in said recess (6), whereby the inside diameter D2 is greater than D3 and is encompassed between the diameter of the recess D1 and the inside diameter D3 of the upper part of the insert (11).

3. Process according to claim 1, wherein an expansion diameter D4 of the expansion tool (7) is greater than the inside diameters D2 and D3 of the insert, such that said tool exerts a radial action on the entire inner wall of the insert, generating residual compression constraints in the part made of metal material and in the part made of composite material, whereby the expansion rate is greater in the metal part than in the composite part.

4. Process according to claim 1, wherein an expansion diameter D4 of the expansion tool (7) is, on the one hand, greater than the inside diameter D3, and, on the other hand, less than the inside diameter D2, such that said tool exerts only a radial action on the upper part of the inner wall of the insert corresponding to the part made of metal material, thus generating residual compression constraints only in the part made of metal material.

5. Process according to claim 1, wherein said insert is a single piece made of metal material.

6. Process according to claim 5, wherein said metal material is selected from the group that comprises steel, titanium, and Invar.

7. Process according to claim 1, wherein said expansion tool comprises a tubular element (702) whose outside diameter D5 is less than the inside diameters D2 and D3 of the insert, and an expansion head (701) whose outside diameter D4 is at least greater than the inside diameter D3 of the insert.

8. Process according to claim 1, wherein the part (1) made of metal material is a metal substrate and the part (2) made of composite material is a panel with a sandwich structure.

9. Method of using the process according to claim 1 for assembling a part made of composite material on a part made of metal material to produce an aircraft structure (100).

* * * * *

UNITED STATES PATENT AND TRADEMARK OFFICE
CERTIFICATE OF CORRECTION

PATENT NO. : 8,458,885 B2  
APPLICATION NO. : 12/934281  
DATED : June 11, 2013  
INVENTOR(S) : Bianco et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this
Eighth Day of September, 2015

Michelle K. Lee
*Director of the United States Patent and Trademark Office*